United States Patent [19]

Asmar

[11] Patent Number: 5,218,420
[45] Date of Patent: Jun. 8, 1993

[54] OPTICAL RESONANCE ACCELEROMETER

[75] Inventor: Romeal F. Asmar, Bellevue, Wash.

[73] Assignee: The Boeing Company, Seattle, Wash.

[21] Appl. No.: 684,678

[22] Filed: Apr. 11, 1991

[51] Int. Cl.$^5$ .............................................. G01B 9/02
[52] U.S. Cl. .................................. 356/352; 356/357; 73/514
[58] Field of Search ............... 356/358, 345, 352, 357; 250/227.19, 227.27; 73/517 B, 517 R, 514

[56] References Cited

U.S. PATENT DOCUMENTS

| | | | |
|---|---|---|---|
| 3,635,562 | 1/1972 | Catherin | 356/358 |
| 4,345,124 | 8/1982 | Abbin, Jr. et al. | |
| 4,372,520 | 2/1983 | Shutt. | |
| 4,452,533 | 6/1984 | Miles et al. | 356/352 |
| 4,572,669 | 2/1986 | James et al. | 356/352 |
| 4,665,747 | 5/1987 | Muscatell | 356/358 |
| 4,825,262 | 4/1989 | Mallinson | 356/352 |
| 4,900,918 | 2/1990 | Killian | 73/514 |

OTHER PUBLICATIONS

Sensor Technology, Nov. 1989, pp. 2–3.
"A Miniature Fabry-Perot Inerferometer Fabricated Using Silicon Micromachining Techniques", Jerman et al., IEEE TH0215-4/88/000-0016, IEEE 1988.

Primary Examiner—Samuel A. Turner
Attorney, Agent, or Firm—Finnegan, Henderson, Farabow, Garrett and Dunner

[57] ABSTRACT

An accelerometer includes a mass, a spring diaphragm, a collimating lens, and an optical interferometer formed between the mass and collimating lens. The mass and spring diaphragm are preferably formed from stainless steel, but the spring diaphragm may be formed from silicon and the mass from amorphous quartz. The interferometer exists between a mirrored surface of the mass, and a partially reflective surface of the collimating lens.

16 Claims, 3 Drawing Sheets

5,218,420

OPTICAL RESONANCE ACCELEROMETER

BACKGROUND OF THE INVENTION

1. Field of the Invention

The invention relates to a device for measuring acceleration by varying the resonance of an optical interferometer.

2. Description of the Related Art

Optical resonators which are tuned by varying the internal optical path length are well known. This type of optical resonator has been named after its inventors and is known as a Fabry-Perot etalon or interferometer. Such a interferometer consists of a pair of partially reflecting mirrors separated at a predetermined distance. That predetermined distance, and any material medium therein, defines the resonant wavelength or frequency. A theoretical description of the Fabry-Perot etalon can be found *Optical Electronics*, 3rd Edition, by Amnon Yariv, the disclosure of which is hereby incorporated herein by reference.

It is also known that a mass suspended by a spring will produce a linear displacement when the stress in the spring is well within the elastic region. This is particularly true with small displacements which are well below the 0.2% yield point of the spring material. Accelerometers are distinguished from each other by their means for suspending the proof mass (the mass to be accelerated), means for damping movement of the mass, and the type of sensors used for measuring displacement. Most of the time, little or no consideration is given to the accelerometer's proof mass distribution about the spring. This neglect results in measurement errors produced by orthogonal accelerations and vibration rectification errors produced by mass distributions subject to dynamic vibrating environments.

It is desirable to have an accelerometer which senses displacement using optical interference. It is further desirable to have an accelerometer with reduced orthogonal acceleration and vibration rectification errors.

SUMMARY OF THE INVENTION

The advantages of the invention will be set forth in part in the description which follows, and in part will be obvious from the description, or may be learned by practice of the invention. The advantages of the invention will be realized and attained by means of the elements and combinations particularly pointed out in the appended claims.

In accordance with the present invention, as embodied and broadly described herein, an accelerometer for measuring acceleration comprises a proof mass for transforming the acceleration to be measured into a force; means, resiliently supporting the mass, for transforming the force into displacement of the mass; means for directing a light beam; and an optical interferometer between the producing means and mass, wherein the optical interferometer has an optical path axis and an optical path length along the axis which is variable upon the displacement of the mass, the wavelength of the light which is at maximum intensity varying with the change in the optical path length.

Preferably, the transforming means comprises a spring diaphragm and the producing means includes a lens complementary to the interferometer. Further, there preferably is a reflective surface formed on the mass which faces a partially reflective surface on the lens.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute part of the specification, illustrate several embodiments of the aspects and features of the invention, and together with the description, serve to explain the principles of the invention.

DESCRIPTION OF THE PREFERRED EMBODIMENTS

Reference will now be made to the presently preferred embodiments and implementations of the invention, as illustrated in the accompanying drawings. Whenever possible, the same reference numbers will be used throughout the drawings to refer to the same or like parts.

Figure 1:
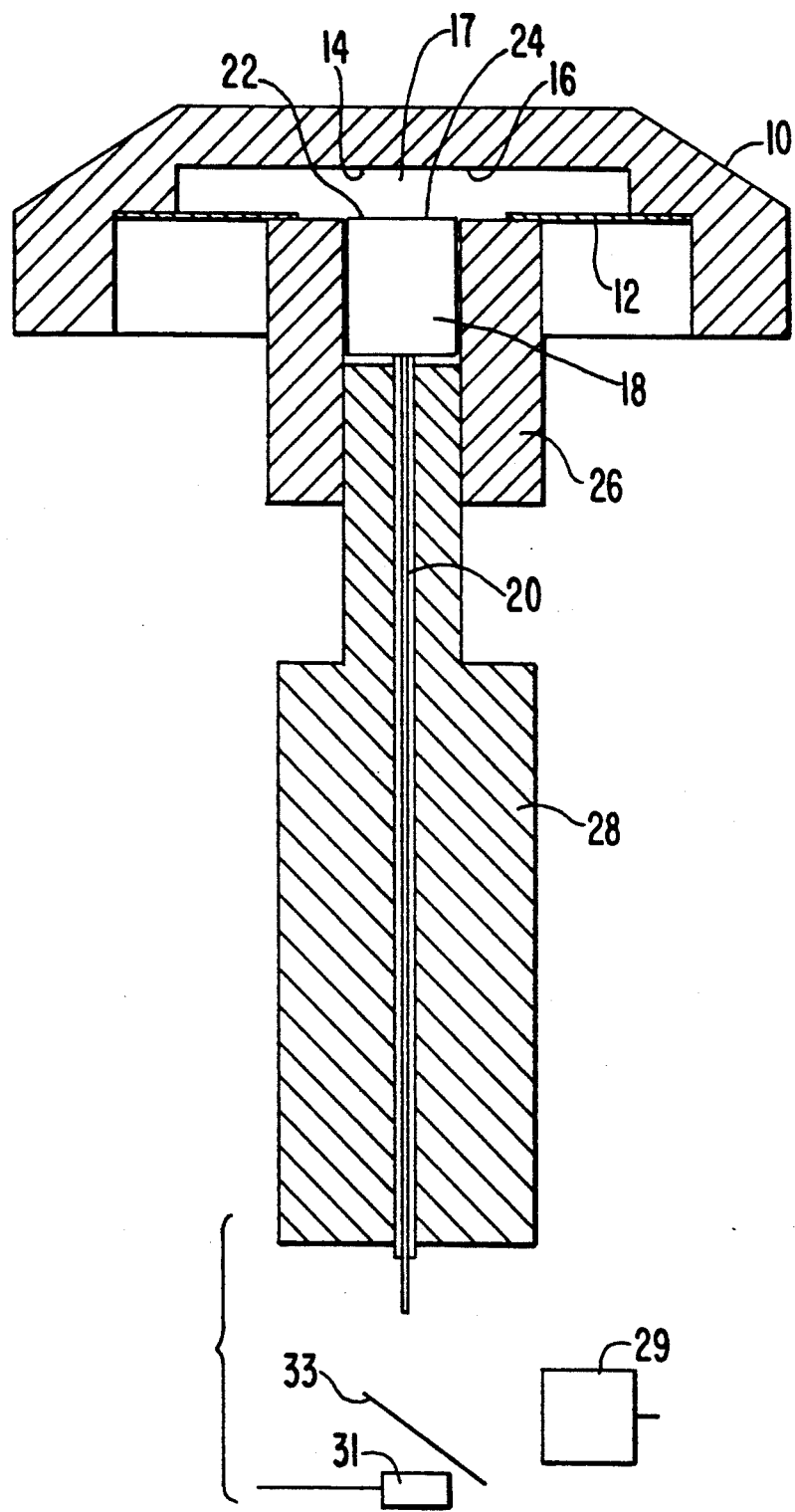
FIG. 1 is a partial cross-section and partial diagrammatic view of an accelerometer according to the invention.

In accordance with the invention, an accelerometer comprises a proof mass for transforming the acceleration to be measured into a force. As embodied herein and shown in FIG. 1, proof mass 10 has an annular shape which is designed so that the mass's center of gravity lies in the plane of the spring 12, discussed below. Therefore, any accelerations orthogonal to the axis of the accelerometer act on the mass along the spring resulting in a net torque of zero about the spring axis. Since the net torque is zero, no displacement of mass occurs and the optical cavity dimensions remain unchanged. Under a dynamic environment, such as random or sine vibration, the mass is evenly distributed about the spring axis, and thus, there will be no zero shift errors due to vibration rectification.

Preferably, the mass is constructed of type 303 stainless steel. The mass is produced by manufacturing processes known in the art. "Coarse" mass symmetry adjustments are made by precisely measuring the machine part and inserting the data into a computer-controlled machine tool, which determines the proper surfaces for removal of material and the final dimensions of the part. "Fine" mass adjustments are made on final assembly by vaporizing mass, as required, from either side of the spring plane while the assembly is being vibrated. This fine adjustment requires removing only milligrams of the material. Additionally, the technique of mass removal for balancing is similar to that used for dynamic balancing of gyro rotors.

Preferably, inside surface 14 of mass 10 is polished to a fine flat finish, and then is gold plated by vacuum deposition, electroplating, or other means known in the art. The inside surface then becomes reflecting mirror 16 with a reflectivity (R) of approximately 98 percent. Reflecting mirror 16 forms part of optical interferometer 17, as will be discussed below.

In accordance with the invention, an accelerometer 10 comprises means, resiliently supporting the mass, for transforming the force into a displacement of the proof mass. As embodied herein, the transforming means includes a planar, annular spring diaphragm 12. The diaphragm performs the function of a mechanical spring. The stiffness of the diaphragm is selected using conventional strength of materials analysis such that a desired displacement of the mass is achieved under the design accelerations of the accelerometer. Under high G conditions, the spring is stiff and the mass is light; under low G conditions, the mass is relatively heavier and the spring is relatively less stiff. Additionally, the design of spring diaphragm 12 is such that the mass is displaced in a translational fashion as opposed to a cantilevered rotation. Errors introduced by cross accelerations are vastly reduced in a translational accelerometer of this design compared with a cantilevered rotational accelerometer. Spring diaphragm 12 is preferably made of type 303 stainless steel by a photochemical machining. The photochemical machining allows the thickness of the diaphragm to be controlled within millionths of an inch. Microphoto Inc. of Detroit, Mich. commercially offers a proprietary photochemical machining process, which can produce over 1,000 diaphragms in one manufacturing sheet. The spring diaphragm is attached to the mass preferably by laser welding. Such laser welding produces virtually no loss in mass or damage to the diaphragm. In calculating the displacement of mass 10 for a given acceleration the mass of diaphragm 12 must be added to the overall accelerated mass of the system.

A mass-spring system according to the invention is very stiff. Only very small displacements of mass 10 on the order of a partial optical wavelength are required. For example, given that the linear dimensions of the interferometer will be shifting over a range of 700-940 nm, the spring mass system can be tuned to result in a full range displacement of 9.84 microinches for a 1 g accelerometer. This magnitude of displacement would give an undamped mechanical resonance of approximately 1,400 Hertz. Higher g ranges corresponding to higher mechanical resonances are obtained by increasing the thickness of the diaphragm, or by reducing the mass.

In accordance with the invention, an accelerometer comprises means for producing a light beam. As embodied herein, means for producing a light beam preferably includes graduated refractive index lens 18 which is used to convert the light from optical fiber 20 into a collimated light beam. However, under certain conditions, as discussed later, collimated light is not required and a lens may be used which complements the particular configuration of reflectors used. A lens for producing a collimated light beam is available from Nippon Sheet Glass under the trademark "SELFOC." The odd-multiple quarter wavelength section for a wavelength of 825 nm is selected for the Selfoc lens. One side 22 of lens 18 is partially coated with a layer of gold or silver to produce a partially transmissive, partially reflective mirror 24 with a reflectivity of approximately 60%. The mirror forms the second side of optical interferometer 17, as discussed below.

The Selfoc lens 18 and the optical fiber 20 may be purchased as an assembly from Nippon Sheet Glass, as for example a standard P-type collimator. A standard optical collimating lens, a partially silvered mirror and an optical fiber can be used to replace the system purchased from Nippon Sheet Glass.

In accordance with the invention, an accelerometer comprises an optical interferometer between the producing means and the mass, wherein the inteferometer has an optical path axis and an optical path length along the axis which is variable upon displacement of the proof mass. The interferometer causes the wavelength of the light which is at maximum intensity to vary with the change in the optical path length. As embodied herein, interferometer 17 is formed between mirrored surface 16 of mass 10 and mirrored surface 24 of collimating lens 18.

The maximum optical resonance, $f_m$, of the interferometer is given by $$f_m = mc/(2nl \cos \theta)$$

where c (frequency × desired wavelength) is the velocity of light in a vacuum, n (= 1) is the index of refraction of the medium in the interferometer, l is the spacing between reflective planes in the interferometer, and m is any integer. For normal incidence to the reflective planes in the interferometer, the cos $\theta$ equals 1. Thus, in order for the interferometer to have resonance at a specific wavelength, the interferometer spacing (l) must be an integer multiple of the desired wavelength.

Figure 3:
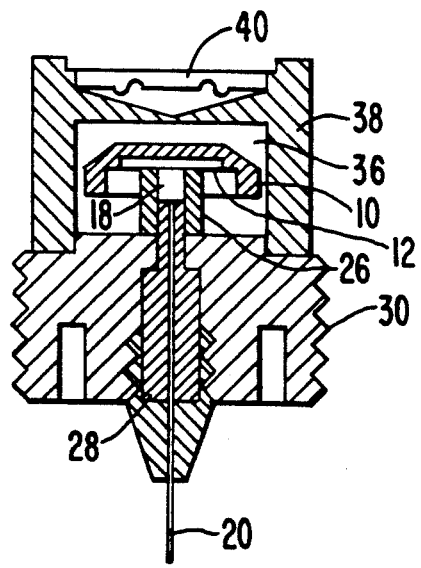
FIG. 3 is a cross-sectional view of a second embodiment of a fluid damped accelerometer according to the invention.
Figure 4:
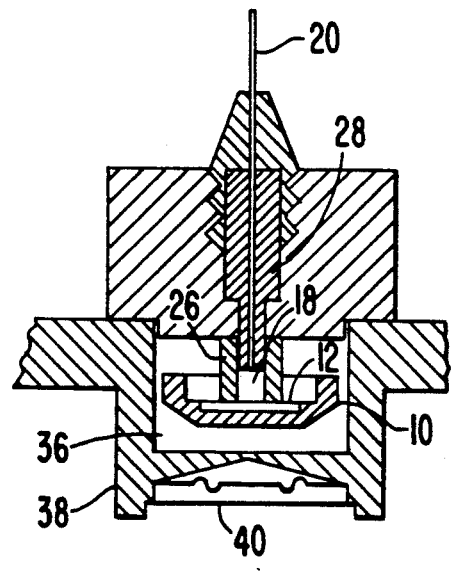
FIG. 4 is a cross-sectional view of a third embodiment of a fluid damped accelerometer according to the invention.

The width of the resonant peak, allowing for reflection losses, is dependent upon the magnitude of reflectivity (R). This effect is shown in FIGS. 4-3 and 4-4 of Yariv, *Optical Electronics*.

To produce the desired optical cavity length, the fiber and the lens are actively micropositioned using a single axis linear stage. The position of the lens is actively varied and the resultant resonance is determined by a wavelength analyzer. Once in position, lens assembly 18 is epoxied in place using a UV curable epoxy. Optical fiber 24 is then potted into the basic mount using a pliable elastomer, as known in the art, such as Dow Corning No. 632 silicon rubber, to provide additional strength and strain relief for the optical fiber.

In order to minimize the interferometer dimensional changes due to temperature, the length of the interferometer is kept to less than 400 microinches (10 microns). Therefore, the length change due to a change in temperature of 100° C. results in less than 0.6% of full scale error in the interferometer resonance. In addition, the resonant inteferometer is allowed to expand and contract in an unrestrained fashion so as not to introduce any errors due to internal strains in the material. Therefore, the lens is anchored at the interferometer side and is allowed to expand at the rear of the assembly. Additionally, mass 10 and pedestal 26 are constructed of the same material to minimize any thermal mismatch.

Support pedestal 26 is machined from stainless steel and performs several functions. First, it supports the spring diaphragm and secondly, it provides an interface mounting of the basic sensor to any outside mounting fixtures.

Pedestal 26 is preferably laser welded to an outside stainless steel mount. A third function of the pedestal is to house the optics for the collimating lens/mirror and the optical fiber. Optical fiber ferrule 28 is preferably provided extending from the pedestal 26. Ferrule 28 protects and supports the optical fiber. The optical fiber is connected to an optical source 29 and optical receiver 31 by partially transmissive mirror 33. An optical broadband (multiple wavelengths) source 29 may be of types known in the art, such as an array of light emitting diodes, and optical receiver may also be of types known in the art. Light is projected from the optical source through the optical fiber, is reflected in the interferometer, and travels back to the optical receiver through the optical fiber.

Techniques are known in the art for decoding the signal produced by an interferometer as used in the invention. For example, if multiple-wavelenth (frequency) light is input into the accelerometer, as the path length changes, resonance will occur at a succession of different wavelengths corresponding to different optical path lengths.

Determination of the wavelength at which resonance occurs allows determination of the optical path length, since the wavelength and optical path are designed to be within a predetermined range. The thus-determined optical path length can be compared with the optical path length under zero acceleration. The difference in length can be converted into acceleration given that the spring rate and the mass are known.

Figure 2:
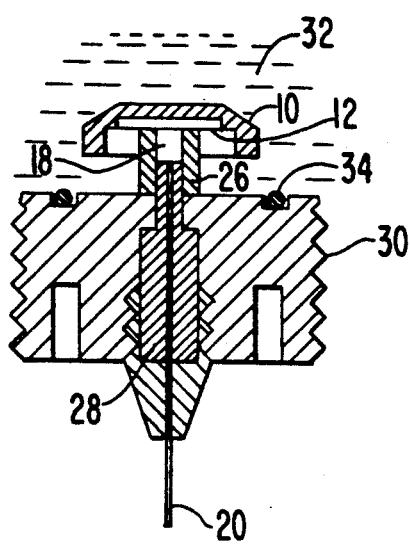
FIG. 2 is a cross-sectional view of a first embodiment of a fluid damped accelerometer according to the invention.
Figure 5:
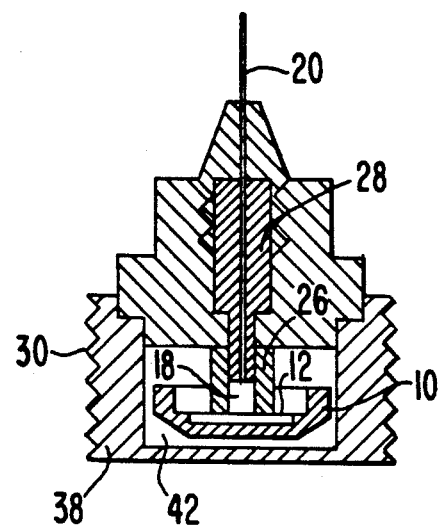
FIG. 5 is a cross-sectional view of an embodiment of an air damped accelerometer according to the invention.

FIGS. 2-5 display various mounting and damping configurations for an accelerator according to the invention. Both fluid and air damping may be used to produce a reasonably flat frequency response versus acceleration amplitude curve. In FIG. 2, a simple threaded mount 30 is used that places the sensor head into fluid 32 such as transmission fluid in a helicopter. "O" ring 34 prevents leakage of fluid 32. In FIGS. 3 and 4, self-contained fluid 36 is provided within housing 38 which is preferably welded to support pedestal 26. Threads 30 are provided on pedestal 26 to allow the accelerometer to be screw mounted. Expansion diaphragms 40 are placed in the housing to accommodate fluid expansion due to temperature. FIG. 5 shows an example of a squeeze-film air damping system using air 42 within housing 38.

Figure 6:
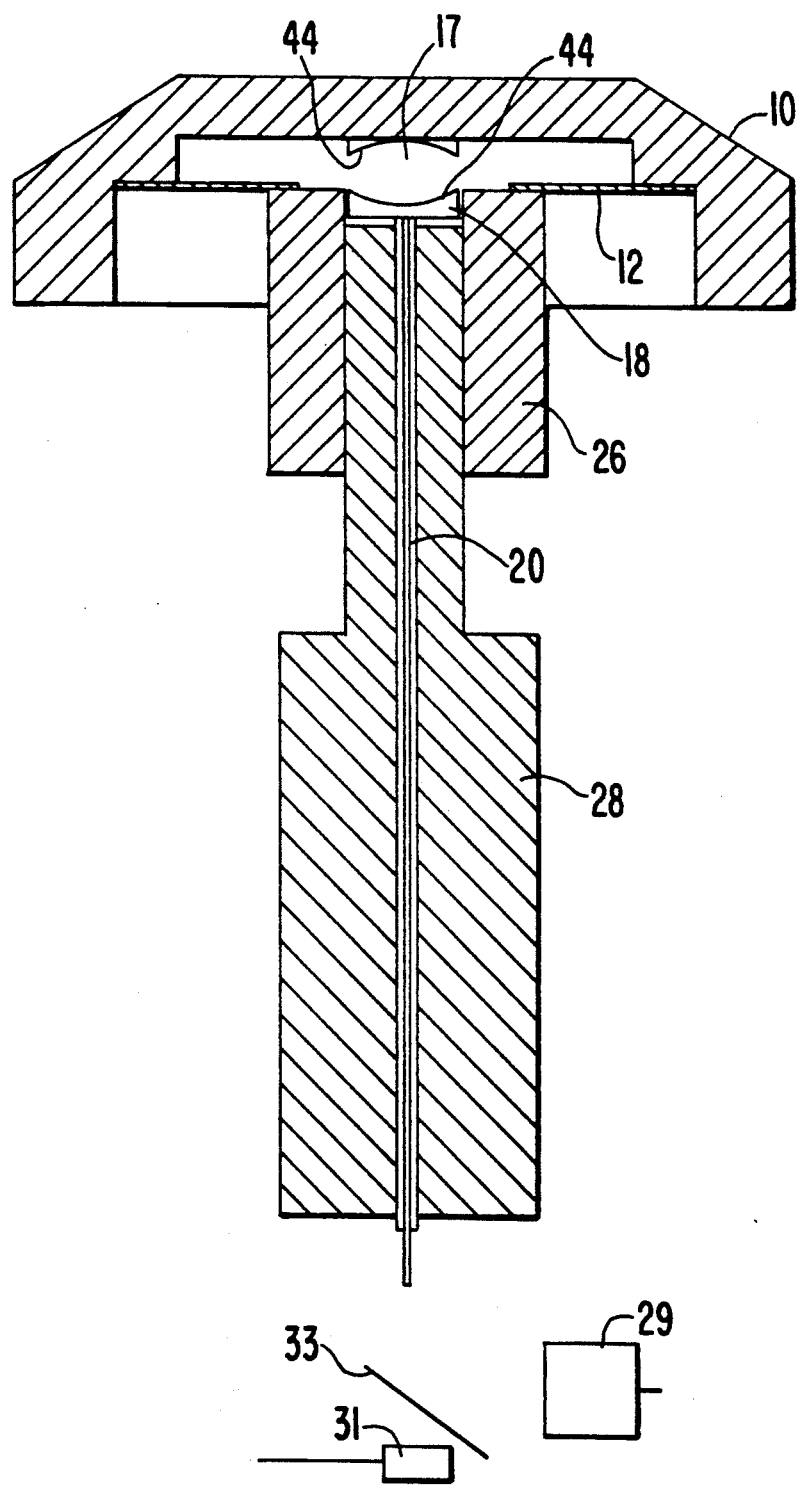
FIG. 6 is a cross-sectional view of an embodiment of an accelerometer according to the invention having confocal mirrors.

Various modifications can be made to the arrangement of an accelerometer according to the invention. It is possible to replace the two parallel plane mirrors with two spherical mirrors 44, as shown in FIG. 6, to reduce light loss at the edges of the reflected beam. Alternatively, the mirrors may be symmetrically confocal, or both spherical and confocal. If spherical or confocal mirrors are used the light beam need not be collimated. Therefore a relatively weak lens 18, or no lens, may be used instead of the collimating lens discussed above. The geometrical design requirements for a stable optical resonance condition using these types of mirrors can be obtained from Yariv, *Optical Electronics,* Third Edition.

It is possible to substitute different materials in the accelerometer design. For example, the pedestal and the diaphragm can be combined into one element using silicon. This part could be chemically etched using boron-doped silicon to form the diaphragm and ordinary silicon in the pedestal. Furthermore, the proof mass could be formed of silicon which is etched. Any of several known silicon to silicon bonds could be used to join the proof mass and diaphragm. Additionally, amorphous quartz could be used for the proof mass and diaphragm, and its shape could be manufactured by chemical etching and laser machining. The inside cavity of the quartz mass could be covered with a chrome-gold deposition to produce a mirror. The two parts could then be bonded with a low temperature glass frit. The pedestal could be bonded with an intermediate expansion glass to a metal structure, which may be a Kovar metal structure. This entire assembly could then be laser welded into one of many standard mounting configurations.

It will be apparent to those skilled in the art that various other modifications and variations can be made to the accelerometer of this invention without departing from the scope of spirit or the invention. It is known, for example, that degradation of interferometric effects from spurious reflections can be mitigated by frequency-shifting techniques. Also, various other materials may be used which are optimized for the specific environment in which the accelerometer will be operating.

Other embodiments of this invention will be apparent to those skilled in the art from consideration of the specification practice of the invention disclosed herein. It is intended that the specification and examples be considered as exemplary only, with a true scope and spirit being indicated by the following claims.

What is claimed is:

1. An accelerometer comprising:
   a proof mass for transforming acceleration to be measured into a force;
   means, resiliently supporting the proof mass, for transforming the force into displacement of the proof mass;
   an optical broadband light source for producing a multiple wavelength light beam;
   means for directing the light beam, said directing means including a collimating lens; and
   an optical interferometer between the directing means and mass, wherein the optical interferometer has an optical path axis and an optical path length along the axis which is variable upon the displacement of the mass and means for providing an output for the light, the intensity of the light at individual wavelengths being variable with variation of the optical path length.

2. The accelerometer as claimed in claim 1, wherein there is a plane of rigidity in which said transforming means is substantially rigid, and wherein the center of gravity of the proof mass is substantially located in the plane of rigidity when the proof mass is not subject to an acceleration, so that components of acceleration in said plane of rigidity cause substantially no variation in optical path length.

3. The accelerometer as claimed in claim 2, wherein said plane of rigidity is orthogonal to said optical path axis.

4. The accelerometer as claimed in claim 1, further including an annular pedestal which houses the directing means.

5. The accelerometer as claimed in claim 4, wherein the transforming means includes a substantially-planar annular spring diaphragm, the spring diaphragm structurally connecting the proof mass and the pedestal.

6. The accelerometer of claim 5, wherein the center of gravity of the mass is substantially in the plane of the spring diaphragm when the proof mass is not subject to acceleration.

7. The accelerometer as claimed in claim 6, wherein the spring diaphragm is substantially rigid in the plane of the diaphragm and resilient along an axis of resiliency substantially orthogonal to the plane, and wherein the axis of resiliency is substantially coincident with the optical path axis, so that components of acceleration in the plane cause substantially no variation in optical path length.

8. The accelerometer as claimed in claim 1, wherein the transforming means substantially prevents displacement of the proof mass in any direction other than not coincident with the optical path axis.

9. The accelerometer as claimed in 1, wherein the directing means includes a collimating lens with a partially reflective surface, and wherein the proof mass includes a mirrored surface facing the partially reflective surface.

10. The accelerometer as claimed in claim 1, wherein the directing means includes a lens and wherein the accelerometer further comprises:
 a first spherical mirror affixed to the mass opposite the lens; and
 a second partially-reflective spherical mirror facing the first mirror.

11. The accelerometer as claimed in claim 10, wherein the second mirror is formed in the lens.

12. The accelerometer as claimed in claim 5, wherein the spring diaphragm and the pedestal are formed in one unit.

13. The accelerometer as claimed in claim 10, wherein the first and second spherical mirrors are confocal.

14. The accelerometer as claimed in claim 1, wherein the accelerometer further comprises:
 a first symmetrical mirror affixed to the mass opposite the collimating lens; and
 a second partially-reflective symmetrical mirror facing and confocal with the first mirror.

15. The accelerometer of claim 1, further comprising means for determining the wavelength of highest intensity of the light from the output means.

16. The accelerometer of claim 1, further comprising means, surrounding the proof mass, for damping movement of the proof mass.

* * * * *